US007364437B2

(12) United States Patent
Xu et al.

(10) Patent No.: US 7,364,437 B2
(45) Date of Patent: Apr. 29, 2008

(54) ELECTRONIC DEVICE HOUSING

(75) Inventors: Mo Xu, Singapore (SG); YiRen Hong, Singapore (SG); Pohlye Lim, Singapore (SG); Niroot Jierapipatanakul, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/196,901

(22) Filed: Aug. 4, 2005

(65) Prior Publication Data
US 2007/0032103 A1 Feb. 8, 2007

(51) Int. Cl.
*H01R 12/00* (2006.01)
(52) U.S. Cl. ..................................... 439/76.1
(58) Field of Classification Search ............. 439/76.1, 439/660, 638, 629, 65, 61, 607; 360/78.12, 360/91.02; 361/807; 220/315
See application file for complete search history.

(56) References Cited

U.S. PATENT DOCUMENTS

| 5,097,978 | A | | 3/1992 | Eckerd |
| 5,533,889 | A | * | 7/1996 | Scalia et al. ................ 425/315 |
| 5,696,648 | A | * | 12/1997 | Jeong et al. .............. 360/97.02 |
| 5,847,896 | A | | 12/1998 | Stefansky |
| 6,228,866 | B1 | * | 5/2001 | Taniguchi et al. .......... 514/299 |
| 6,233,816 | B1 | | 5/2001 | Franke et al. |
| 6,250,932 | B1 | * | 6/2001 | Smith et al. ................... 439/61 |
| 6,259,032 | B1 | | 7/2001 | Fernandez |
| 6,347,021 | B2 | * | 2/2002 | Kazmierczak et al. ... 360/97.02 |
| 6,427,317 | B1 | | 8/2002 | Choi |
| 6,574,118 | B1 | | 6/2003 | Russell et al. |
| 6,629,359 | B2 | | 10/2003 | Choi |
| 6,735,043 | B2 | * | 5/2004 | Bernett et al. ........... 360/97.01 |
| 6,999,323 | B1 | * | 2/2006 | Aronson et al. ............. 361/753 |

\* cited by examiner

*Primary Examiner*—Alexander Gilman
(74) *Attorney, Agent, or Firm*—Shumaker & Sieffert, P.A.; Daniel T. Lund; H. Sanders Gwin, Jr.

(57) ABSTRACT

The invention includes techniques for mounting a printed circuit board (PCB) on a housing for an electronic device. The housing includes a top cover that combines with a base to form an internal space within the housing. The PCB has at least one tab that extends from it and fits within a recess formed by the base to secure the PCB on a side of the base opposite to the internal space. The electronic device may additionally include a shield such that the PCB fits between the shield and the base and the shield assists in securing the PCB to the base. The housing may also include a locking mechanism to constrain the PCB tab to the base. Embodiments of the invention allow for a PCB to be mounted to an electronic device housing without the use of screws.

18 Claims, 9 Drawing Sheets

ELECTRONIC DEVICE HOUSING

TECHNICAL FIELD

The invention relates to electronic device housings.

BACKGROUND

Disc drives typically include a base on which various drive components are mounted. A cover combines with the base to form a housing that defines an internal environment of the disc drive. The components include a spindle motor, which rotates one or more media discs at a constant high speed. Information is written to and read from tracks on the media discs through the use of an actuator assembly. The actuator assembly includes actuator arms, which extend towards the discs. Mounted on each of the actuator arms is a read/write head, which includes an air bearing slider enabling the head to fly in close proximity above the corresponding media surface of the associated disc.

Increases in storage media density have allowed disc drive manufactures to produce disc drives with large capacities that are much smaller than disc drives generally found in desktop computers. A typical standard disc drive has a disc with an outer diameter of 3.5 inches (95 mm). Small form factor discs have sizes less than that; e.g., 2.5 inches (65 mm), 1.8 inches (47 mm), 1.3 inches (35 mm), 1.0 inches (25 mm) are currently available, and even smaller discs are currently in development. As the demand for smaller and more powerful electronic devices, including disc drives, increases, housings for the devices must manage space requirements more efficiently. Hard drive enclosures are examples of housings that face these constraints.

For example, as the form factor size is reduced, printed circuit board (PCB) area for a hard drive is also reduced. A PCB on a small disc drive generally requires all of the functions of a PCB on a bigger drive. For example, a PCB may include control functions for the operation of the drive and communication protocol to communicate with a device, e.g., a computer, that uses the hard drive. In very small drives, the area of a PCB dedicated to mounting screws for the PCB becomes significant relative to the overall area of the PCB. The space taken up by a screw head on a PCB cannot be used for electronic components. Furthermore, automation tooling used to mount a PCB using screws can require even more unused space on the PCB near screw mounting holes. This unused space on a PCB can make designing and manufacturing small disc drives difficult.

SUMMARY

Techniques for mounting PCBs in electronic devices without using screws are described. Also described are techniques for manufacturing and design of small form factor electronic devices. For example, an electronic device housing forms a slot in which a PCB is mounted. The PCB may include one or more tabs designed to fit into recesses of the electronic device housing. The electronic device housing may include a base on which internal components of the device are mounted. The base may include sidewalls that face in a direction away from the internal components mounted on the base. In such embodiments, the slot in which the PCB is mounted may be on an inner surface of the sidewalls and the sidewalls may substantially surround the PCB. For example, the electronic device housing may be a housing of a disc drive.

In an embodiment, an electronic device includes a printed circuit board (PCB) and a housing including a base. The PCB includes a mounting surface for mounting an electrical component a first tab that extends from the PCB. The base forms a first recess that accepts the first tab and holds the PCB in the first recess.

In another embodiment the invention is directed to a method of assembling a housing for an electrical component. The method includes positioning a PCB such that a mounting surface of the PCB faces a base of the housing. The method also comprises inserting a first tab of the PCB into a first recess formed by sidewalls of the base to attach the PCB to the base In a different embodiment, a disc drive comprises a set of internal components and a base. The set of internal components is mounted on the base, and the base includes sidewalls which extend away from the set of internal components. The disk drive has a form factor of one inch or less.

Advantages of the systems and techniques described herein may include any or all of the following: eliminating the need for screws; providing a more efficient and less expensive manufacturing method; decreasing hardware cost of a device; reducing the device leakage or contamination; increasing the space available for device components; allowing for designs having a reduced size and simplifying the component layout design.

The details of one or more embodiments are set forth in the accompanying drawings and the description below. Other features, objects, and advantages of the various embodiments will be apparent from the description and drawings, and from the claims.

DETAILED DESCRIPTION

Figure 1:
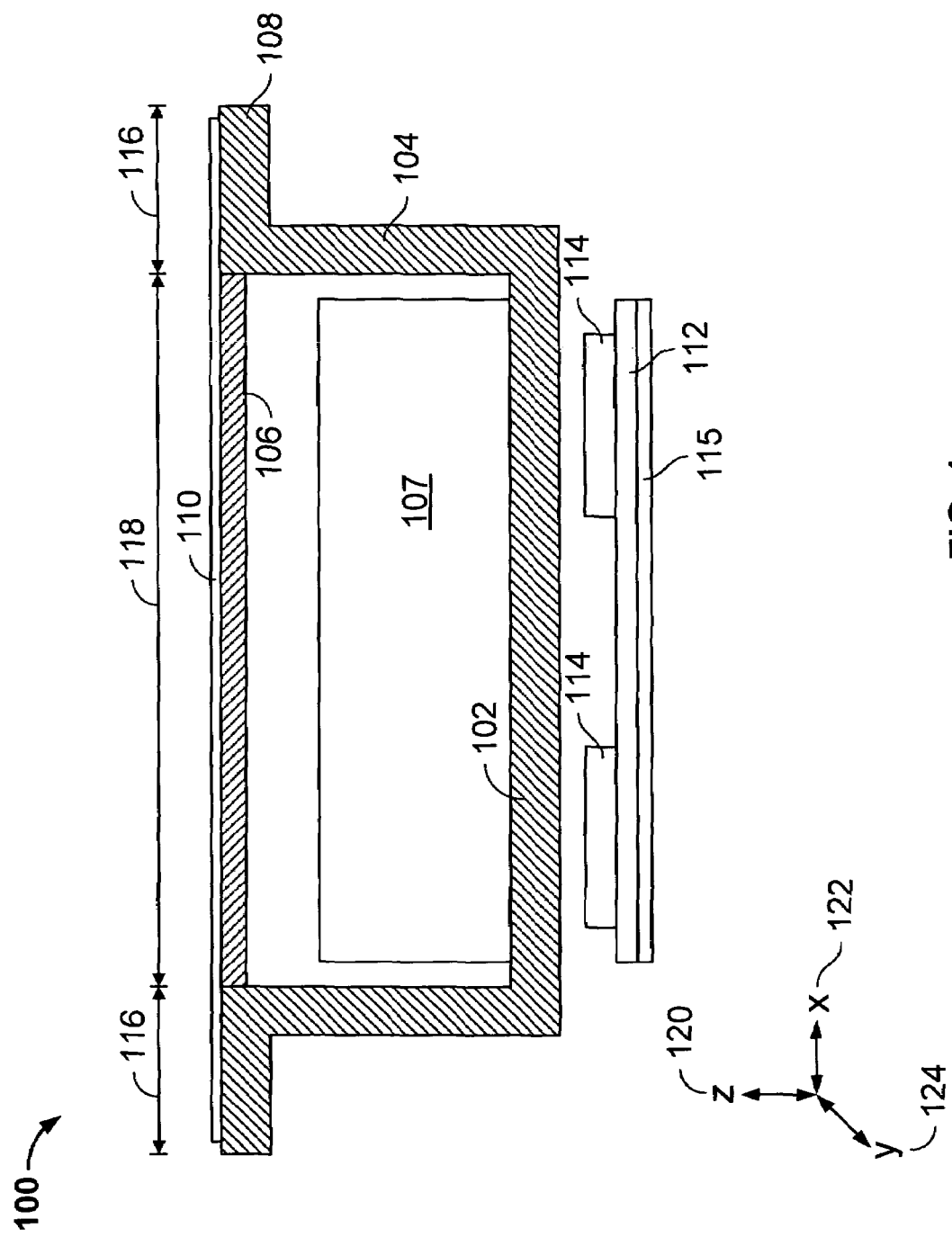
FIG. 1 is a diagram of a prior art space arrangement for an electronic device.

FIG. 1 shows a current space arrangement for an electronic device 100, such as a hard drive. The device 100 has a base 102 with base sidewalls 104 and a top cover 106 forms a housing for the device 100. The base sidewalls 104 extend towards the top cover 106 until a point approximately where the top cover meets the sidewalls 104. The sidewalls 104 have extensions 108 that extend outward in a direction parallel with the top cover 106. Internal device components 107 reside on the base 102. For example, if the device 100 was a hard drive, the components 107 may include at least one hard drive media platter and an actuator arm with read/write heads. The top cover 106 covers the components 107, and the cover's external surface is aligned with a surface of the sidewall extensions 108. In this example, a tape seal 110 is located across the external surface of the cover 106 and the surface of the extensions 108. The seal 110 prevents containments from entering the internal portions of the device and damaging the components 107. Outside of the base 102 is a PCB 112 that typically has mounted electrical components 114 that control aspects of the device's operation. Adjacent to the PCB 112 is a shield 115 that protects the components 114 from electromagnetic interference (EMI).

The sealing method shown in FIG. 1 requires the device 100 to reserve an external width 116 to ensure that proper sealing performance is maintained. This requirement, in turn, reduces an internal width 118 left for the internal device components 107. Alternatively, length and width of the device may be increased by two times the external width 116 because the width 116 is necessary on all sides of the device 100.

Figure 2:
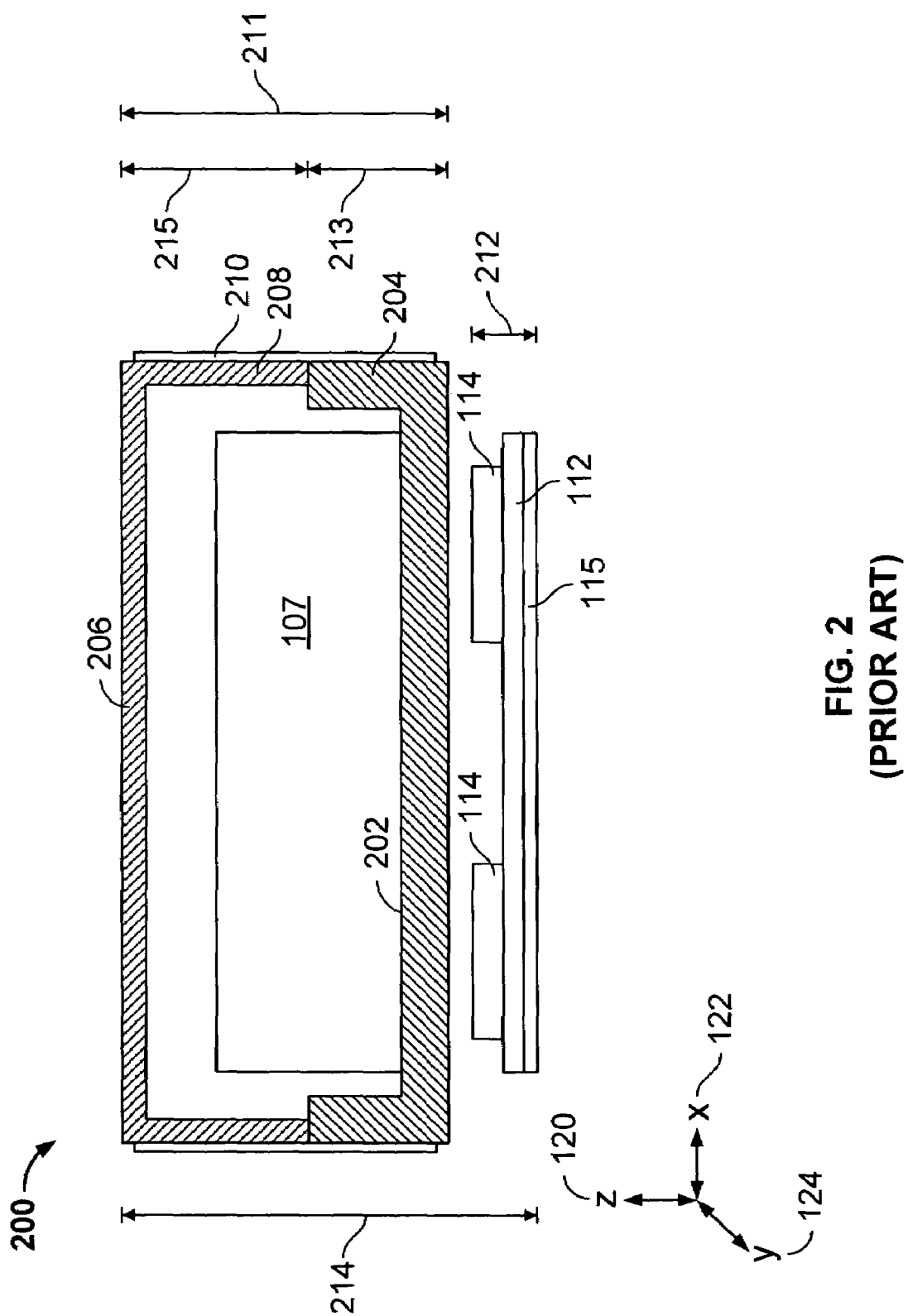
FIG. 2 is a diagram of another prior art space arrangement for an electronic device.

FIG. 2 shows another space arrangement for an electronic device 200, such as a hard drive. The device 200 has a base 202 with base sidewalls 204 and a top cover 206 with top cover sidewalls 208. The base sidewalls 204 and the top cover sidewalls 208 extend toward each other and enclose the internal device components 107. A tape seal 210 is located along the aligned surfaces of the top cover sidewalls 208 and the base sidewalls 204. The device 200 may also have the PCB 112 with the electrical components 114 and the shield 115.

The sealing method shown in FIG. 2 requires that the device 200 have a sealing height 211 large enough to ensure an adequate seal. Because the seal 210 is positioned along the sidewalls 204 and 208, the maximum sealing height 211 is the sum of a base sidewall height 213 and a top cover sidewall height 215. The device 200 also requires a PCB height 212 to be reserved for the PCB 112, the components 114, and the shield 115. In order to maintain a smaller device height 214, the sealing height 211 is typically reduced because the PCB height 212 must be reserved. This reduction makes it difficult to guarantee that the device's seal is adequate. Moreover, the process used to seal the device 200 becomes more difficult when the size of the tape seal 210 is small.

Both the devices 100 and 200 shown in FIGS. 1 and 2, respectively, require a clearance on all sides of the devices between the base sidewalls 104 and 204 and the internal device components 107. The components 107 are installed on the bases 102 and 202 from an opening created by the absence of the top covers 106 and 206. The clearance is necessary to ensure that tooling used to install the components 107 does not collide with the sidewalls during an installation. Also, the raised base sidewalls 104 and 204 dictate that the components 107 be installed from the z-direction 120 because the sidewalls obstruct an installation from either the x or y-directions 122 and 124. The clearance and directional limitations can increase the amount of time and effort required for automated component installation.

The devices 100 and 200 also typically reserve space for screws used to mount the PCB 112 to the bases 102 and 202 and to mount the shield 115 to the PCB 112 and the bases. The space requirement for the screws in the PCB may be increased further because no electrical components 114 may sit across a screw. The layout of components 114 may be difficult and inefficient because the screw's head takes up a relatively large amount of space.

Figure 3:
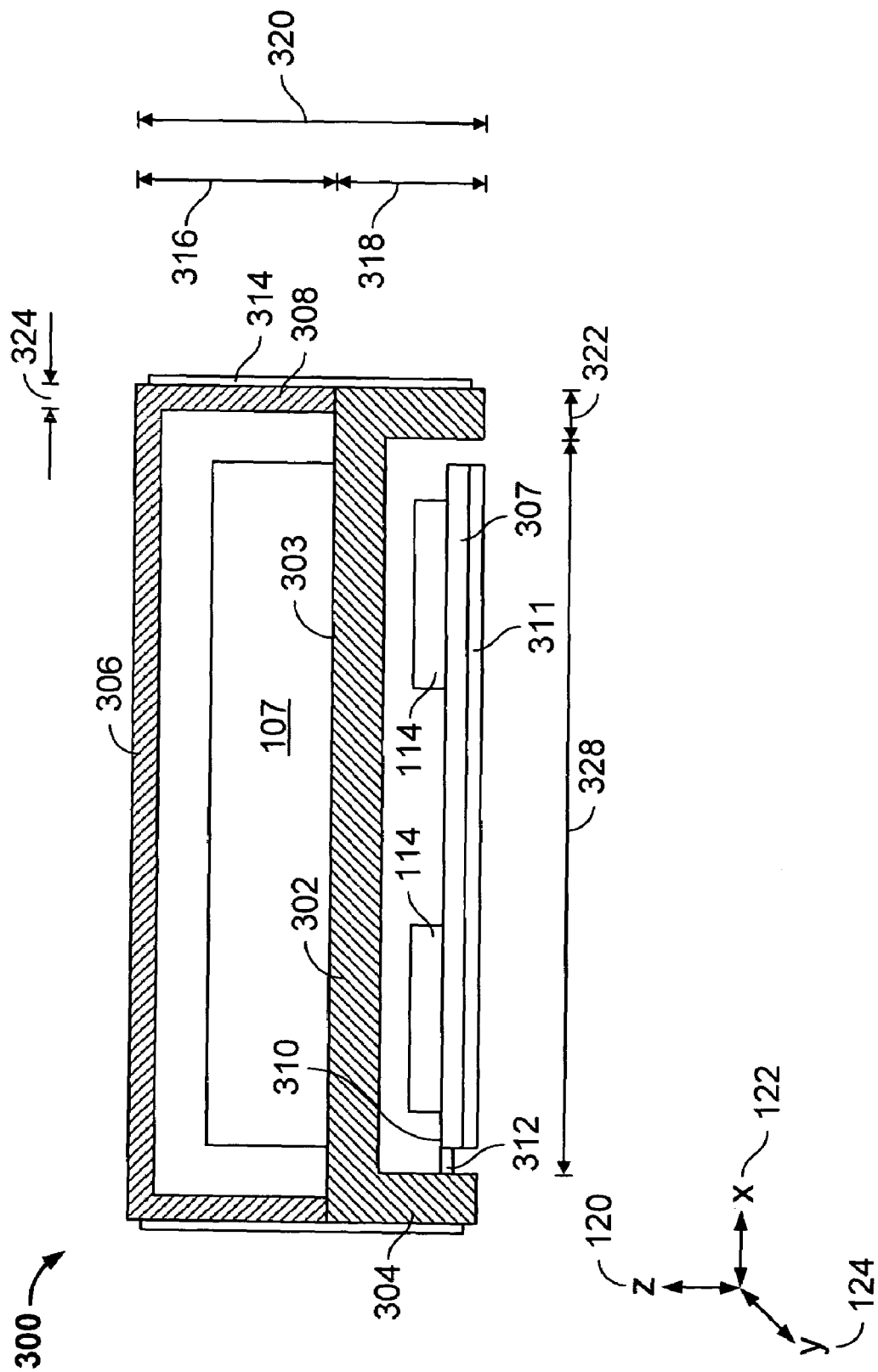
FIG. 3 is a diagram of an exemplary space arrangement for an electronic device.

FIG. 3 is a diagram of an exemplary space arrangement according to an embodiment of the invention for an electronic device 300. The device 300 has a base 302 with base sidewalls 304 forming a housing, and may have a top cover 306 with top cover sidewalls 308. Components 107 are mounted on surface 303 of base 302. The device 300 also has a PCB 307 with electrical components 114 that are mounted on a mounting surface 310 of the PCB 307. A shield 311 may be adjacent to a surface of the PCB 307 that is opposite the mounting surface 310. A tab 312 extends from the PCB 307 and is accepted by a recess (not shown in FIG. 3) in the base sidewalls 304. The tab 312 and recess are discussed later in greater detail. In contrast to devices 100 and 200, electronic device 300 may be easier to manufacture, has a smaller height requirement to provide enough space for tape seal 314 and allows for PCB 307 to be mounted without the use of screws.

The base sidewalls 304 extend towards the mounting surface 310, and may surround the PCB 307, as shown. The top cover sidewalls 308 may also extend towards the mounting surface and be positioned on the base 302 in a way that aligns outer surfaces of both the base and top cover sidewalls 304 and 308. A tape seal 314 can be located along the outer surfaces of the sidewalls to protect the internal device components 107 from contaminants. The seal height may be substantially equal to the top cover height 316 and base height 318, which may equal the total height of the device 320. As compared to device 200 in FIG. 2, the seal height extends beyond height 316, the portion of the housing that forms an internal environment holding components 107. For example, height 214 in FIG. 2 may be similar to height 320 in FIG. 3. This may increase the sealing performance of the tape seal 314 because of the increased seal height.

The embodiment shown in FIG. 3 may increase the efficiency of an automated manufacturing process for the device 300 as compared to device 200 in FIG. 2. Because the base sidewalls 304 extend toward the mounting surface 310, they do not obstruct installation of the internal device components 107. In the absence of the top cover 306, the components 107 may be installed from x, y, and z-directions 122, 124, and 120, or a combination thereof. This flexibility can decrease the installation time and may simplify the installation process because component installation tooling is not restricted to installing from the z-direction 120. Furthermore, base 302 may be machined or otherwise processed to accept disc drive components 107. In the same manner, the position of base sidewalls 304 may simplify the manufacturing process of base 302.

Furthermore, additional space may be reserved for the components 107 because the top cover sidewall thickness 324 is thinner than the base sidewall thickness 322. If the base sidewalls 304 extended towards the top cover 306, the space available for components 107 would be limited by the base internal width 328. Instead, because the base sidewalls 304 extend toward the mounting surface 310 of the PCB 307, the top cover sidewalls 308 define the space reserved for the internal components 107. This increased internal space provides more room for the components 107, which may increase power, functionality, and/or capacity of the device. For example, if the device is a hard drive, the space saved may be allocated to a voice coil motor (VCM) actuator. The larger VCM actuator can then achieve a higher current force, which enables the drive to use less power when controlling the actuator. Alternatively, if the space saved may be used to reduce the height 316.

The described advantages of base 304 may be particularly beneficial to small form factor disc drives, in particular to drives having a form factor of one inch or less. Small form factor drives are generally more difficult to design and manufacture for the obvious reason of spatial constraints. Providing access to surface 303 from x, y, and z-directions 122, 124, and 120, or a combination thereof may greatly simplify manufacturing of device 300 as compared to device 100 or device 200 in FIGS. 1 and 2 respectively.

Figure 4A:
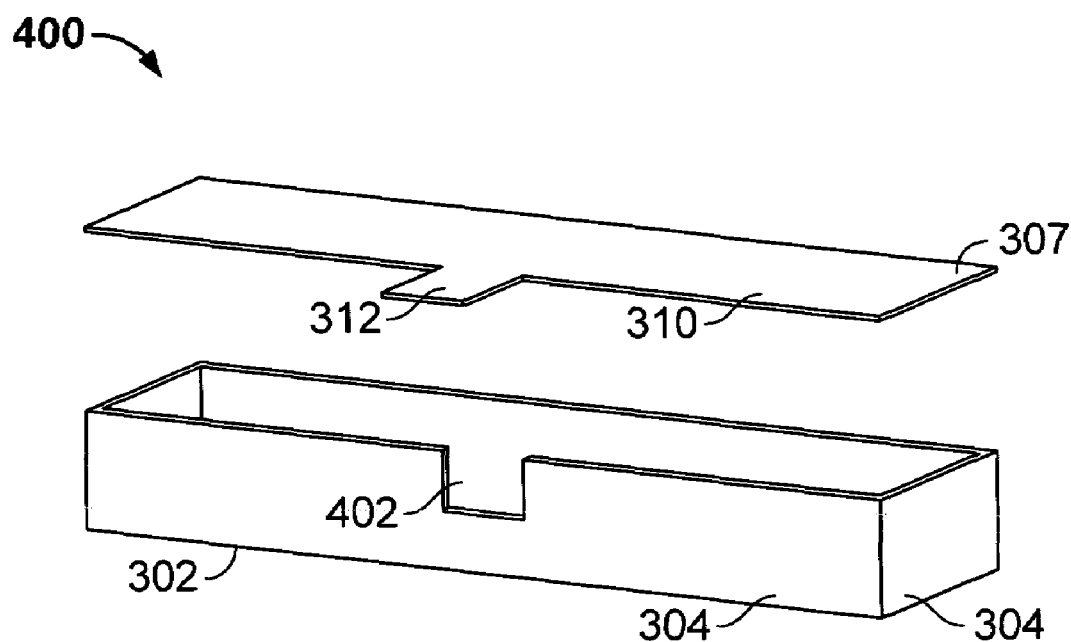
FIGS. 4A and 4B are diagrams of one embodiment of a system for engaging a PCB with a base without screws.
Figure 4B:
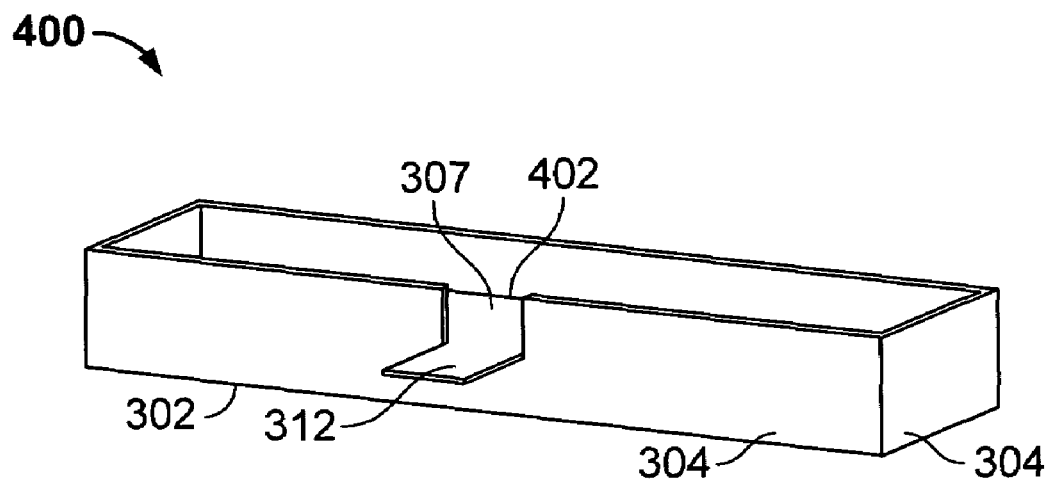

FIGS. 4A and 4B are diagrams of one embodiment of the system 400 including the PCB 307 and the base 302. The PCB 307 may be attached to the base 302 without screws. The tab 312 may extend from the PCB 307 on the same plane as the mounting surface 310. In other embodiments not shown, the tab 312 may extend in a plane substantially parallel to a plane of the mounting surface 310, or it may extend at an angle between zero and one hundred thirty-five degrees normal to a plane parallel to the mounting surface. In other embodiments, the tab 312 may also be positioned on different sides of the PCB 307 and multiple tabs may be present. The base 302 has the base sidewalls 304 that extend towards the mounting surface 310. The base sidewalls 304 have a recess 402, which may be an indentation in a sidewall or pass entirely through a sidewall, as shown in FIG. 4. The recess 402 may be located at various positions in the sidewalls 304 and may be various depths or shapes. A top cover is not shown in FIG. 4A or 4B, but may also be included as part of a housing with base 302.

As shown in FIG. 4B, the recess 402 accepts the tab 312. The PCB 307 may be positioned so that it is surrounded by an inner surface of the base sidewalls 304 as the tab 312 is inserted in the recess 402. In some embodiments, the inner surface of the sidewalls 304 may completely surround the PCB 307 after insertion of the tab 312. In other embodiments, the PCB 307 may be partially surrounded. The PCB 307 may be positioned in the base 302 at an angle or in a plane substantially parallel to a plane formed by the top of the sidewalls 304.

Figure 5:
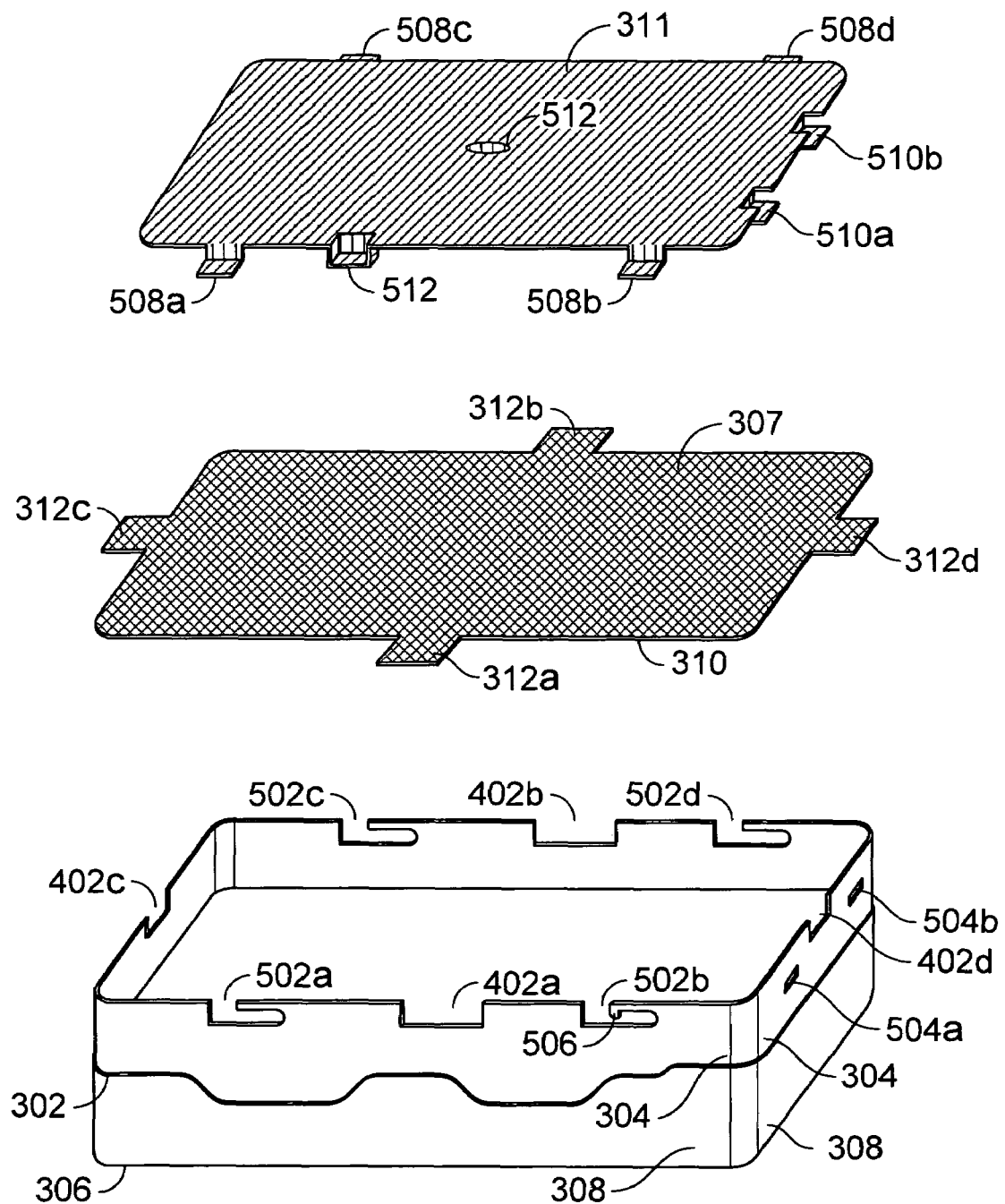
FIG. 5 is a more detailed diagram of the system of FIGS. 4A and 4B before installation of the PCB and a shield.

FIG. 5 is a more detailed diagram of the system 400 of FIGS. 4A and 4B before installation of the PCB 307 and the shield 311. This installation process will be discussed later in greater detail. FIG. 5 shows one embodiment of the base 302 with the top cover 306, the PCB 307, and the shield 311. In this example, the base sidewalls 304 have four recesses 402a, 402b, 402c, and 402d that can accept tabs on the PCB 307. The base sidewalls 304 also have four recesses 502a, 502b, 502c, and 502d that can accept tabs on a constraining device, such as the shield 311. In other embodiments, the constraining device may include the PCB 307, other parts external or internal to the device, or a combination thereof. Additionally, the base sidewalls 304 may have apertures 504a and 504b for accepting the tabs on the PCB 307, the shield 311, or a combination thereof. The apertures in the embodiment shown in FIG. 5 accept the tabs 510a and 510b on the shield 311.

As shown in FIG. 5, the base 302 may have different heights at points where the top cover sidewalls 308 contact it. These differing heights may be the result of cavities used to accommodate larger components 114 (not shown in FIG. 5) mounted on the PCB 307 after the PCB is engaged with the base. The heights may also depend on the height required by the highest internal drive component 107 (not shown in FIG. 5) and on the sealing area required for an adequate tape seal. The top cover sidewalls 308, which extend towards the base 302, can have corresponding heights so that the sidewalls 308 may contact the base at the points of differing heights. The corresponding heights of the sidewalls 308 with the base 302 provide a surface without gaps to which the tape seal 314 (not shown in FIG. 5) may be applied. The base 302 may be manufactured using a variety of technologies, including stamping, casting, and machining.

One or more of the recesses in the sidewalls 304 may have a locking mechanism. In the embodiment shown in FIG. 5, the recess 502b has the locking mechanism 506. The mechanism 506 can be a protrusion into a portion of the recess 502b and permit a tab to enter the recess but not exit. The mechanism 506 can be tapered on one side but not the other, so that a tab may enter the recess 502b but is prevented from exiting because of the flat side. In other embodiments the locking mechanism may include a latch, a clamp, and a hook and may include parts such as springs, pins, and crossbars.

Referring to FIG. 5, the PCB 307 may have tabs 312a, 312b, 312c, and 312d. The tabs may extend from the PCB 307 on the same plane as the mounting surface 310. In another embodiment, the tabs may extend from a plane that is substantially parallel to the mounting surface. Alternatively, the tabs may extend from the PCB 307 at an angle between zero and one hundred thirty-five degrees normal to a plane that is parallel to the mounting surface 310. In other embodiments, the tabs may extend from the PCB in a combination of planes and angles.

The shield 311 may also have tabs 508a, 508b, 508c, 508d, 510a, and 510b. In the embodiment shown in FIG. 5, the tabs extend from a plane that is substantially parallel to a surface of the shield 311, but is not on the same plane as the shield 311. This placement may permit the shield 311 to be located over the PCB 307 while still permitting the tabs on the shield 311 to engage the recesses and apertures in the base sidewalls 304. The shield 311 may also have one or more indents. Referring to FIG. 5, the indent 512 may aid the shield 311 in holding the PCB 307 in a fixed position when the PCB 307 and shield 311 are engaged in the base 302. In one embodiment, the indent 512 is located close to a connector on the PCB 307 when it is engaged on the base 302 with the PCB 307. This placement may help reduce connection problems between the connector and the connected part.

Figure 6:
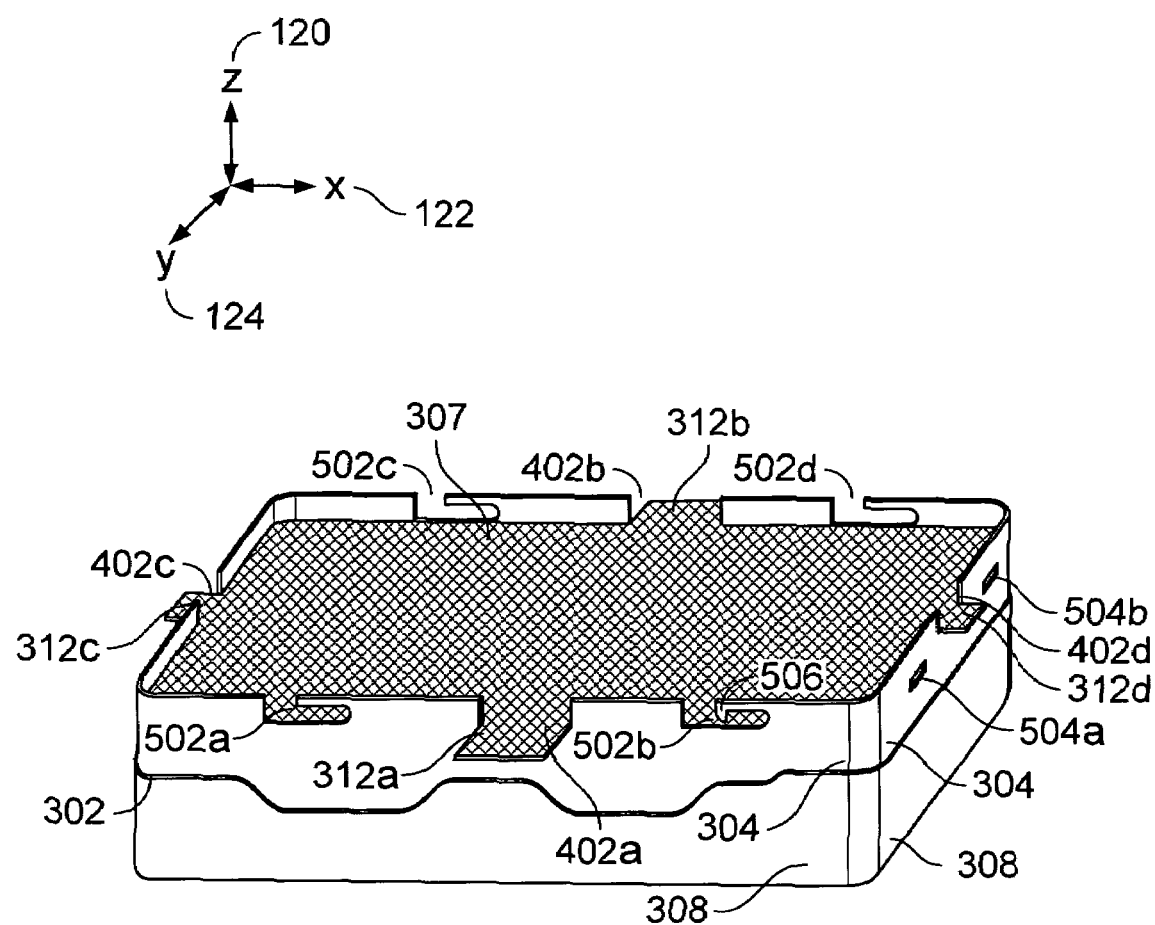
FIG. 6 is a diagram of the system of FIG. 5 with the PCB inserted.

FIG. 6 is a diagram of the system of FIG. 5 with the PCB 307 inserted. In the embodiment shown, the recesses in the base 302 may accept the tabs on the PCB 307. More specifically, the recess 402a may accept the tab 312a, the recess 402b may accept the tab 312b, the recess 402c may accept the tab 312c, and the recess 402d may accept the tab 312d. The tabs on the PCB 307 may be inserted in the recesses by moving the tabs in the z-direction 120 toward the base 302. FIG. 6 shows the tabs in their inserted position. The tabs and recesses can constrain the PCB 307 from rotating or moving in either the x or y-directions 122 or 124. The tabs 312c and 312d and the recesses 402c and 402d constrain the PCB 307 in the y-direction 124. The tabs 312a and 312b and the recesses 402a and 402b constrain the PCB 307 in the x-direction 122. Additionally, the plane from which the tabs extend may control the PCB's position in the z-direction 120. In other embodiments, the tabs and recesses may constrain the PCB 307 in the x, y, and z-directions using a constraint, such as the locking mechanism 506. The mounting surface 310 may face the base 302 after it is inserted, and the base may have cavities to accommodate the sizes of the components 114 mounted to the surface 310. In some embodiments, the PCB 307 may also include grounding points, which serve as a ground reference for the PCB, that contact the base 302 when the PCB is engaged in the base.

Figure 7:
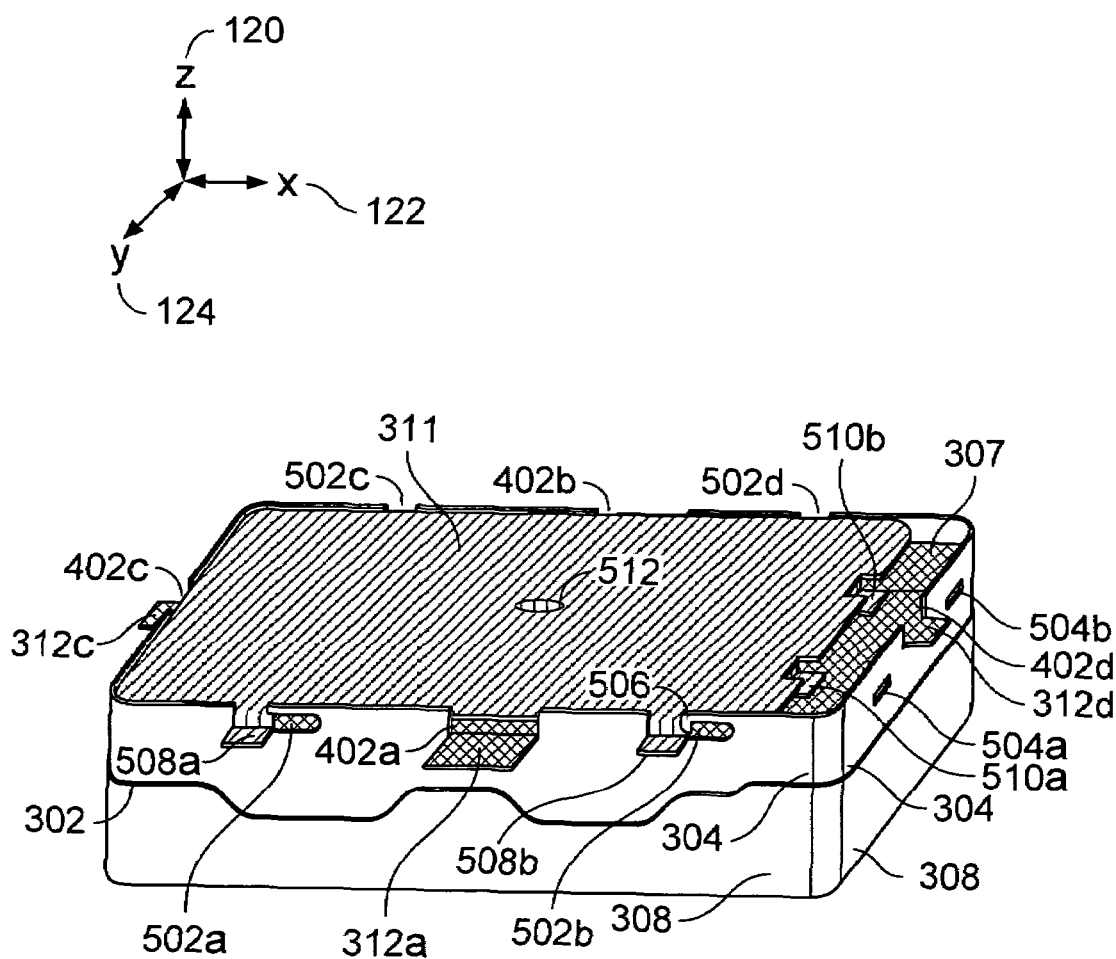
FIG. 7 is a diagram of the system of FIG. 6 with the shield inserted.

FIG. 7 is a diagram of the system of FIG. 6 with the shield 311 inserted. In the embodiment shown, the shield 311 may be placed in the base 302 after the PCB 307 has been inserted. The recesses and apertures in the base 302 may accept the tabs on the shield 311. More specifically, the recess 502a may accept the tab 508a, the recess 502b may accept the tab 508b, the recess 502c may accept the tab 508c (tab not shown), and the recess 502d may accept the tab 508d (tab not shown). The tabs on the shield 311 may be placed in an initial insertion position in the recesses by moving the tabs in the z-direction 120 toward the base 302. The FIG. 7 shows these tabs on the shield 311 in their initial insertion position. After the initial insertion, the shield 311 may be constrained from moving in the y-direction 124, but may move in both the x-direction 122 toward the apertures 504a and 504b and in the z-direction 120 away from the base 302. The apertures 504a and 504b may also accept the tabs 510a and 510b, respectively, but this second insertion position is completed in a process described for FIG. 8.

Figure 8:
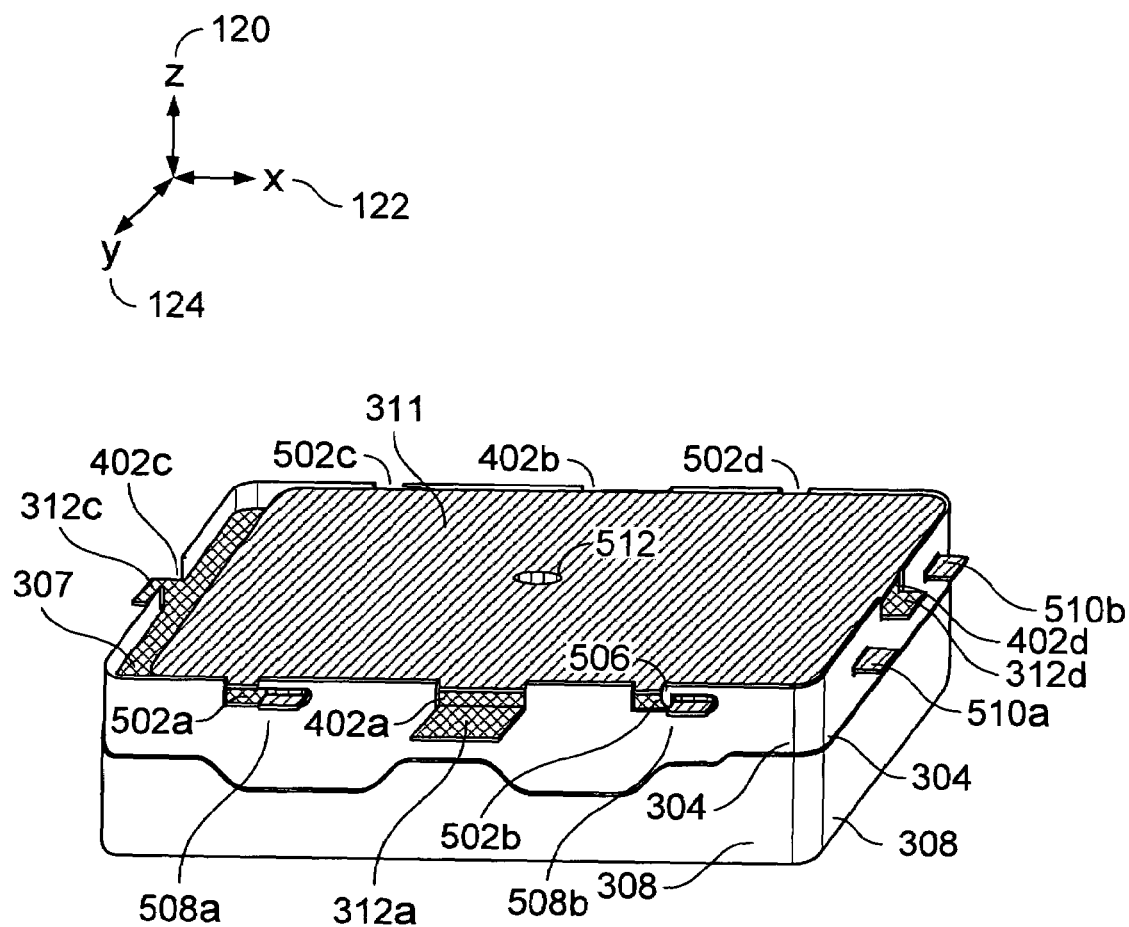
FIG. 8 is a diagram of the system of FIG. 7 with the shield moved into a locked position.

FIG. 8 is a diagram of the system of FIG. 7 with the shield 311 moved into a locked position. After the tabs 508a-508d are placed in the initial insertion position, the shield may slide in the x-direction 122 toward the apertures 504a and 504b. The L-shaped recesses 502a-502d permit the tabs to move in the x-direction 122 into a second insertion position, as shown in the embodiment of FIG. 8. As the shield slides, the tabs 510a and 510b enter the apertures 504a and 504b, respectively. In other embodiments, the shield may slide in other directions or not slide, and the aperture placement may vary or be eliminated. Additionally, a part other than a shield may be used as the constraining device.

Once the tabs 508a-508d are in the second insertion position, one or more of them may be locked there by the locking mechanism 506. The tapered side of the mechanism 506 guides the tab 508b downward, but permits the tab to slide the full length of the recess 502b. After the tab 508b slides past the tapered side of the protrusion, it may return upward. In this position, the flat side of the mechanism 506 prevents the tab 508b from sliding back to the initial insertion position. In other embodiments, the locking mechanism may not have a tapered side. Additionally, the locking mechanism 506 may be on other recesses, such as the recess 502d, the recess 502a, the recess 502c, or a combination thereof.

After the tab 508b is locked, the shield 311 is constrained x, y, and z-directions 122, 124, and 120. The locked shield, in turn, constrains the PCB 307 in the z-direction 120. In the locked position, the indent 512 may contact the PCB 307 to ensure the PCB maintains a fixed position in the z-direction 120. In some embodiments, more than one indent is used to contact and restrain the PCB 307. The indent 512 may also be used to increase the reliability of connections created by connectors on the PCB 307 by placing the indent near a connector on the PCB. In another embodiment, a screw may secure the shield 311 and the PCB 307 to the base 302 to prevent the parts from disengaging from the base if the tabs, the recesses, or the locking mechanism 506 fails. The screw may also be placed near a connector to support a reliable connection.

The use of tabs and recesses has the advantages of eliminating screws. This produces cost savings because the screws are no longer purchased and the manufacturing process is more efficient. With fewer or no screws necessary for assembly of the device, the total cost of the hardware may decrease. Additionally, no tooling or complicated automated process may be necessary to manipulate and use the small screws. Eliminating screws also solves problems associated with drive leakage or contaminates entering the internal portions of the device through screw holes because the holes are no longer necessary. The device also has more space available for other purposes because space reserved for the screws is no longer needed. Additionally, the lack of screws simplifies the component layout design on the mounting surface 310 because the components 114 do not have to avoid the screws.

Figure 9:
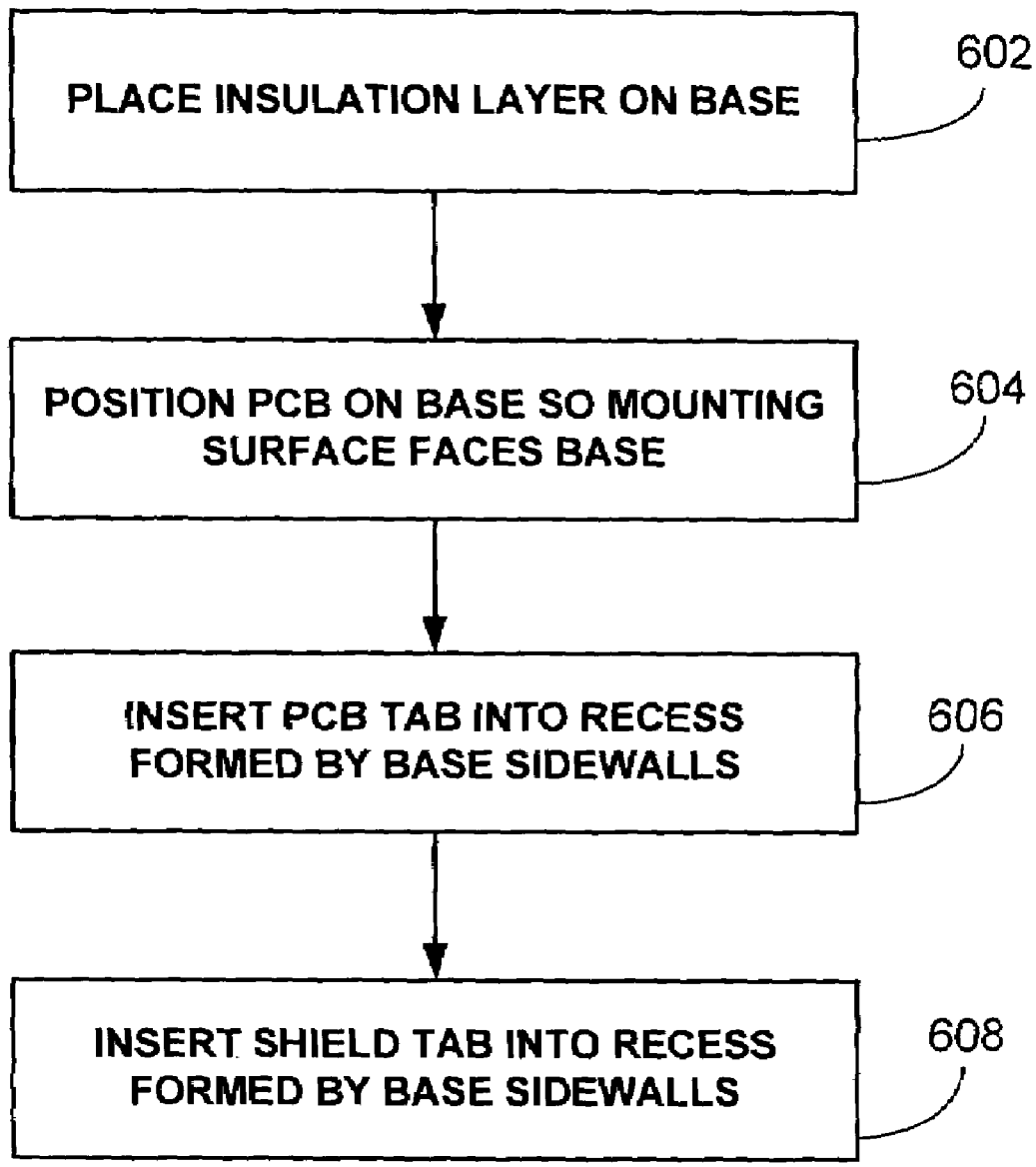
FIG. 9 is a flowchart illustrating a method for assembling an electronic device.

FIG. 9 is a flowchart illustrating a method 600 for assembling an electronic device. For example, the method 600 may be used to install a PCB in a disc drive housing. First, an insulation layer is placed on a base of the housing (602). In some embodiments, the insulating layer may be pre-manufactured on the base. In these embodiments, step 602 is not necessary. Next, a PCB is positioned adjacent to the base with the mounting surface of the PCB facing the base (604). The base may include sidewalls extending towards the mounting surface. In the next step, one or more tabs on the PCB are inserted in to recesses within the base (606). The recesses may be in sidewall of the base. The recesses may pass through the sidewalls to form one or more apertures or simply form indents within the sidewalls. The tabs hold the PCB in place relative to the base. Furthermore, the base may include locking mechanisms to hold the tabs on the PCB to the base. In the final step shown in FIG. 9, a shield is inserted over the PCB (608). The shield also includes one or more tabs to secure the shield to the base. The base may also include locking mechanisms to hold tabs on the shield to the base. In this manner the PCB may constrained within an area defined by the base, including sidewalls and the shield. Additional techniques to attach the PCB, to the base, including screws, are not required.

A number of embodiments have been described. Nevertheless, it will be understood that various modifications may be made without departing from the spirit and scope of the various embodiments. For example, the structures and processes described may be applied to a number of different electronic devices with both large and small form factors. Additionally, assembly may be manual, automated, or a combination thereof. Accordingly, other embodiments are within the scope of the following claims.

The invention claimed is:

1. An electronic device, comprising:
 a printed circuit board (PCB), wherein the PCB includes a mounting surface for mounting an electrical component, and wherein the PCB has a first tab that extends from the PCB, wherein the first tab is one of a plurality of tabs that extend from the PCB, and wherein the plurality of tabs are integral features of the PCB;
 a constraining device adjacent to a surface of the PCB opposite to the mounting surface, wherein the constraining device has a second tab that extends from the constraining device; and
 a housing including a base including base sidewalls forming a first recess that accepts the first tab and a second recess that accepts the second tab, wherein the base holds the first tab in the first recess, wherein the base sidewalls include a locking mechanism that holds the second tab in the second recess, wherein the locking mechanism is a unitary feature of the base sidewalls, wherein the constraining device holds the PCB to the base.

2. The electronic device of claim 1, wherein the base sidewalls extend in a direction toward the mounting surface, and the PCB is substantially surrounded by the base sidewalls.

3. The electronic device of claim 1, wherein the constraining device is a shield.

4. The electronic device of claim 1, wherein the first recess is an aperture that extends though one of the base sidewalls.

5. The electronic device of claim 1, wherein the first tab is coplanar with the mourning surface.

6. The electronic device of claim 1, further comprising a second locking mechanism, wherein the first tab is held in the first recess with the second locking mechanism.

7. The electronic device of claim 1, wherein the locking mechanism comprises a protrusion of the base sidewall that extends into a portion of the second recess, the protrusion preventing the accepted second tab from exiting the second recess, wherein the protrusion is a unitary feature of the base sidewalls.

8. The electronic device of claim 1, further comprising insulation between the base and the PCB.

9. The electronic device of claim 1, wherein the electronic device is a disc drive.

10. The electronic device of claim 1, wherein the locking mechanism comprises at least one of a latch, a clamp, or a hook.

11. The electronic device of claim 1, wherein a surface of the constraining device is on a first plane and the second tab extends from a second plane that is substantially parallel to the first plane, wherein the first plane and second plane comprise different planes.

12. The electronic device of claim 1, wherein the second tab is placed into the second recess in a first insertion position and is then moved to a second insertion position, wherein the locking mechanism holds the second tab in the second insertion position.

13. The electronic device of claim 1, wherein the housing further includes a top cover having top cover sidewalls, wherein the top cover mounts on the base on a side of the base opposite to the PCB to form an internal space of the electronic device.

14. The electronic device of claim 13, further comprising a tape seal on the outer surfaces of the top cover sidewalk and the base sidewalls covering a seam formed between the top cover and the base.

15. The electronic device of claim 13, wherein the top cover sidewalls are thinner than the base sidewalls.

16. An electronic device, comprising:
  a printed circuit board (PCB), wherein the PCB includes a mounting surface for mounting an electrical component, and wherein the PCB has a first tab that extends from the PCB, wherein the first tab is one of a plurality of tabs that extend from the PCB, and wherein the plurality of tabs are integral features of the PCB;
  a constraining device adjacent to a surface of the PCB, wherein the constraining device has a second tab that extends from the constraining device and a third tab that extends from the constraining device; and
  a housing including a base with sidewalls forming a first recess that accepts the first tab to hold the PCB in alignment with the base, a second recess with a locking mechanism that accepts the second tab and an aperture that accepts the third tab,
  wherein the locking mechanism is a unitary feature of the sidewalls,
  wherein the locking mechanism holds the second tab in the second recess to hold the third tab in the aperture and secure the constraining device to the base,
  wherein the constraining device holds the PCB to the base.

17. The electronic device of claim 16, wherein the constraining device includes a fourth tab that extends from the constraining device, where in the sidewalls form a third recess that accepts the fourth tab, wherein the third recess and the fourth tab combine with the first recess and the first tab to hold the PCB in alignment with the base.

18. The electronic device of claim 16, wherein the second tab activates the locking mechanism when the second recess accepts the second tab to secure the constraining device to the base.

* * * * *